United States Patent
Wu et al.

(10) Patent No.: US 12,073,226 B2
(45) Date of Patent: Aug. 27, 2024

(54) IMPLEMENTING EXTERNAL MEMORY TRAINING AT RUNTIME

(71) Applicant: Intel Corporation, Santa Clara, CA (US)

(72) Inventors: Ping Wu, Shanghai (CN); Yingwen Chen, Shanghai (CN); Lei Zhu, Shanghai (CN); Zhenglong Wu, Shanghai (CN); Tao Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 17/794,856

(22) PCT Filed: Feb. 24, 2020

(86) PCT No.: PCT/CN2020/076352
§ 371 (c)(1),
(2) Date: Jul. 22, 2022

(87) PCT Pub. No.: WO2021/168601
PCT Pub. Date: Sep. 2, 2021

(65) Prior Publication Data
US 2023/0041115 A1    Feb. 9, 2023

(51) Int. Cl.
*G06F 9/00* (2018.01)
*G06F 9/4401* (2018.01)
(Continued)

(52) U.S. Cl.
CPC ......... *G06F 9/4403* (2013.01); *G06F 9/4411* (2013.01); *G06F 9/5016* (2013.01); *G06F 1/24* (2013.01); *G06F 9/4401* (2013.01)

(58) Field of Classification Search
CPC .... G06F 9/4403; G06F 9/4411; G06F 9/5016; G06F 9/4406; G06F 9/4418
(Continued)

(56) References Cited

U.S. PATENT DOCUMENTS

| | | | | |
|---|---|---|---|---|
| 2003/0095648 A1* | 5/2003 | Kaib | ................... | A61B 5/0006 379/106.02 |
| 2006/0020758 A1* | 1/2006 | Wheeler | ............. | G06F 12/0862 711/137 |

(Continued)

FOREIGN PATENT DOCUMENTS

WO    2019126921 A1    7/2019

OTHER PUBLICATIONS

Bruce Querbach et al, "Architecture of a Reusable BIST Engine for Detection and Autocorrection of Memory Failures and for IO Debug, Validation, Link Training, and Power Optimization on 14-nm SoC", IEEE Design & Test, vol. 33, No. 1, Jan. 18, 2016, pp. 59-67.

(Continued)

*Primary Examiner* — Volvick Derose
(74) *Attorney, Agent, or Firm* — Jordan IP Law, LLC

(57) ABSTRACT

Systems, apparatuses and methods may provide for technology that initializes an integrated memory of a processor during a boot sequence and conducts a runtime initialization of an external system memory associated with the processor. The technology may also bypass the runtime initialization of the external system memory during the boot sequence.

22 Claims, 6 Drawing Sheets

(51) Int. Cl.
*G06F 9/50* (2006.01)
*G06F 1/24* (2006.01)

(58) Field of Classification Search
USPC .............................................................. 713/2
See application file for complete search history.

(56) References Cited

U.S. PATENT DOCUMENTS

| | | | | |
|---|---|---|---|---|
| 2006/0034142 A1* | 2/2006 | Ooishi | ..................... | G11C 8/10 |
| | | | | 365/230.06 |
| 2013/0151829 A1* | 6/2013 | Amann | ................... | G06F 12/00 |
| | | | | 713/2 |
| 2014/0325197 A1* | 10/2014 | Lewis | ................... | G06F 9/4418 |
| | | | | 713/2 |
| 2015/0095633 A1 | 4/2015 | Yao et al. | | |
| 2015/0154031 A1* | 6/2015 | Lewis | ................... | G06F 21/575 |
| | | | | 713/2 |
| 2015/0185797 A1* | 7/2015 | Cooper | ................ | G06F 1/3275 |
| | | | | 713/340 |
| 2016/0259650 A1* | 9/2016 | Lewis | ................... | G06F 9/4411 |
| 2017/0109070 A1* | 4/2017 | Kim | ..................... | G06F 12/0828 |
| 2017/0168849 A1* | 6/2017 | He | ........................ | G06F 9/4401 |
| 2017/0286679 A1 | 10/2017 | Khare et al. | | |
| 2018/0276010 A1 | 9/2018 | H et al. | | |
| 2020/0249957 A1* | 8/2020 | Qin | ..................... | G06F 12/0871 |
| 2020/0319975 A1* | 10/2020 | Luong | ................ | G06F 11/1417 |
| 2020/0341927 A1* | 10/2020 | Luong | ................ | G06F 13/4027 |
| 2021/0081538 A1* | 3/2021 | Zimmer | ................ | G06F 21/57 |
| 2021/0255966 A1* | 8/2021 | Chen | ..................... | G06F 9/4411 |
| 2021/0326142 A1* | 10/2021 | Banik | ................... | G06F 12/084 |
| 2023/0176735 A1* | 6/2023 | Li | .......................... | G06F 3/061 |
| | | | | 711/154 |

OTHER PUBLICATIONS

International Search Report for International Patent Application No. PCT/CN2020/076352, mailed Oct. 28, 2020, 7 pages.
Wikipedia, "High Bandwidth Memory", retrieved Feb. 12, 2020, 6 pages, <en.wikipedia.org/wiki/High_Bandwidth_Memory>.
Wikipedia, "Memory Reference Code", retrieved Feb. 12, 2020, 2 pages, <en.wikipedia.org/wiki/Memory_Reference_Code>.

* cited by examiner

IMPLEMENTING EXTERNAL MEMORY TRAINING AT RUNTIME

CROSS REFERENCE TO RELATED APPLICATIONS

The present application is a U.S. National Phase Patent Application, which claims the benefit of priority to International Patent Application No. PCT/CN2020/076352 filed on Feb. 24, 2020.

TECHNICAL FIELD

Embodiments generally relate to memory training. More particularly, embodiments relate to implementing external memory training at runtime.

BACKGROUND

In conventional computing systems, a processor may use DRAM (dynamic random access memory) as external system memory to hold data and programs that are in use. To ensure proper operation of the system memory, a BIOS (basic input/output system) based memory training mode may initialize and train the system memory during a boot sequence. As DRAM modules grow in memory capacity, training time also tends to increase, which in turn results in longer boot times. Moreover, for MRC (memory reference code) updates (e.g., modifying training commands) to take effect, a reboot of the computing system may typically be involved, where the reboot further reduces the active time of the computing system.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
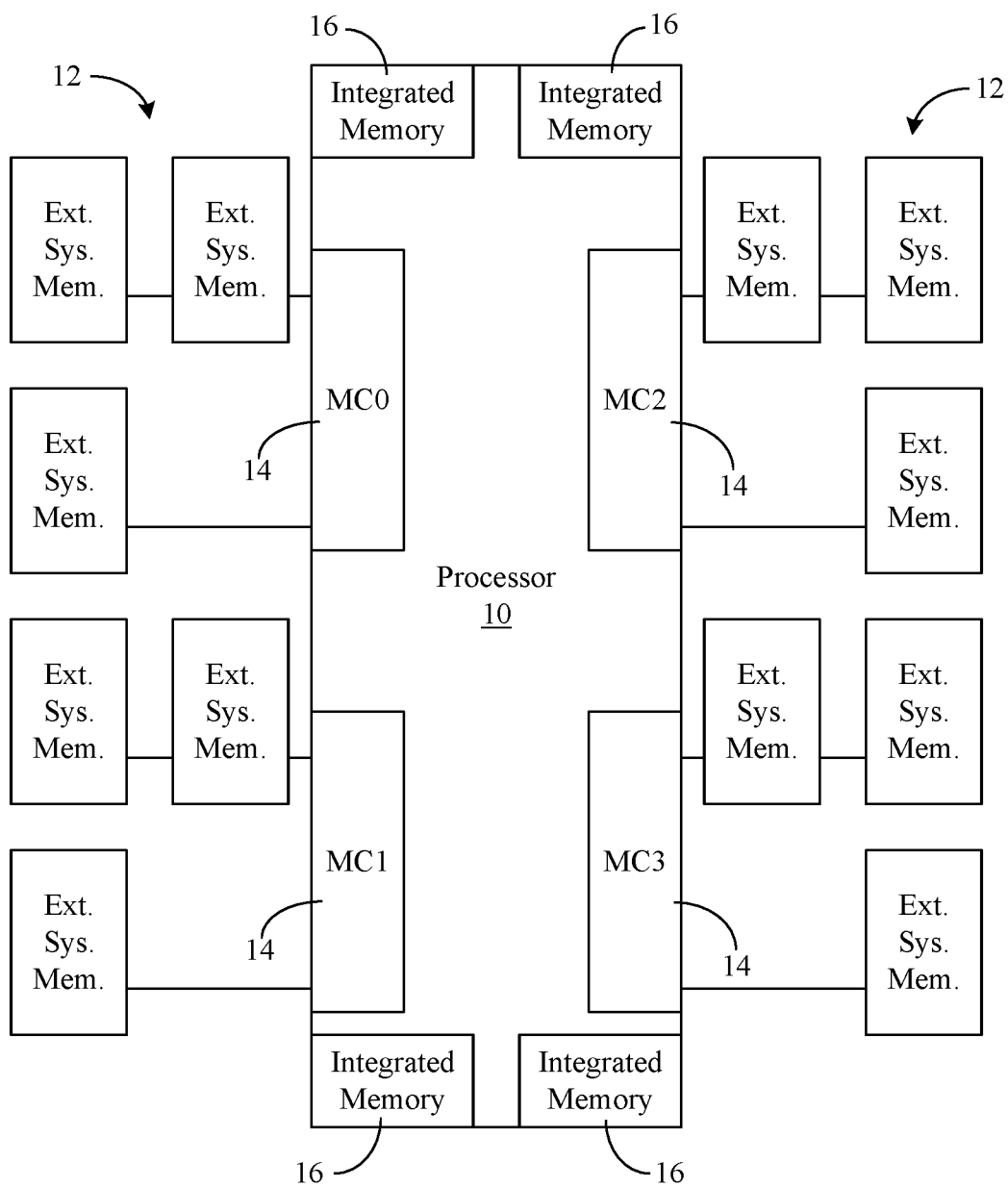
FIG. 1 is a block diagram of an example of a processor according to an embodiment.

Turning now to FIG. 1, a processor 10 is shown in which the processor 10 is to coupled to external system memory 12. In an embodiment, the external system memory 12 may include DRAM memory modules (e.g., dual inline memory modules/DIMMs) such as, for example, DDR4 (Double Data Rate 4) synchronous DRAM (SDRAM) modules, DDR5 (Double Data Rate 5) SDRAM modules, and so forth. The illustrated processor 10 also uses a set of memory controllers (MCs) 14 to communicate with the external system memory 12.

In an embodiment, the processor 10 includes integrated memory 16 such as, for example, high bandwidth memory (HBM). HBM, which is a high-performance RAM interface for three-dimensional (3D) stacked DRAM, may be particularly useful when the processor 10 is operated as a high-performance graphics accelerator, a network device, etc. Accordingly, the integrated memory 16 may achieve higher bandwidth while using less power in a substantially smaller form factor than the external system memory 12. Moreover, compared with the external system memory 12, training the integrated memory 16 is relatively fast and simple. In one example, the processor 10 and integrated memory 16 supports multiple stacks (e.g., four) of 3.2/2.8 Ghz HBM2E (HBM $2^{nd}$ Generation Evolutionary) memory providing, for example, a sum of 64 GB or more of in-package memory. Indeed, the integrated memory 16 training time may be on the order of 10% of the external system memory 12 training time.

As will be discussed in greater detail, the processor 10 may initialize only the integrated memory 16 during the BIOS based memory training, which significantly decreases boot time. Thus, the integrated memory 16 may be used as system boot memory. Once post-memory silicon initialization is complete, the OS (operating system) may handle the initialization and training of the external system memory 12 at runtime. Indeed, MRC updates may take effect after re-training the external system memory 12 at runtime (e.g., bypassing a reboot of the computing system). Such an approach may therefore significantly enhance performance through faster boot times and MRC updates.

Figure 2:
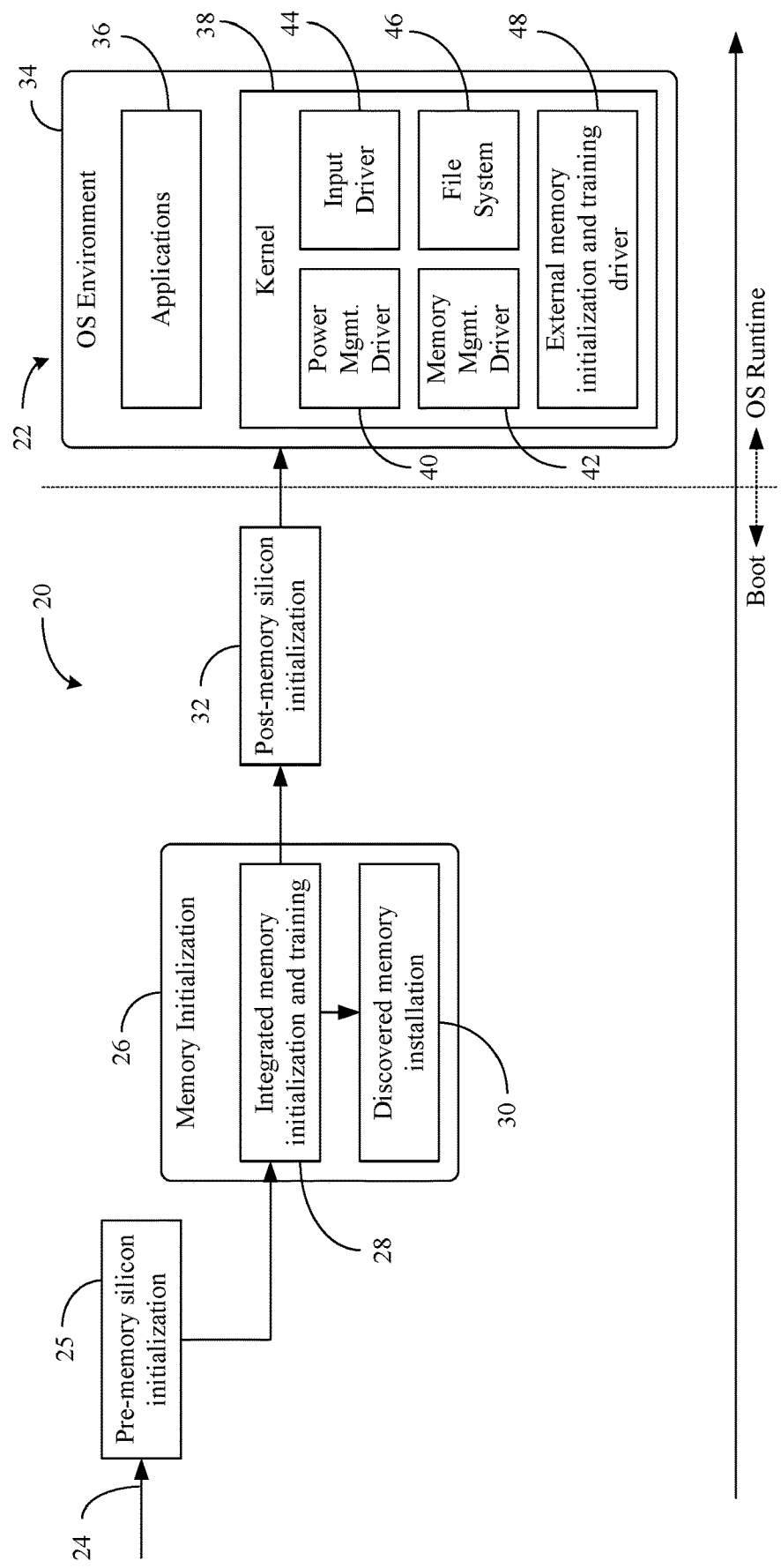
FIG. 2 is an illustration of an example of a boot sequence and operating system (OS) runtime according to an embodiment.

FIG. 2 shows a boot sequence 20 and an OS runtime 22 in which a power on event 24 triggers a pre-memory silicon initialization 25, followed by a memory initialization 26. In the illustrated example, the memory initialization 26 includes an integrated memory initialization and training procedure 28, which is followed by a discovered memory installation 30 and a post-memory silicon initialization 32 during the boot sequence 20. Of particular note is that no training of external system memory is conducted during the boot sequence 20. Accordingly, the amount of time to reaching the OS runtime 22 is relatively short. In an embodiment, the OS runtime 22 includes an OS environment 34 having one or more applications 36 and an OS kernel 38. The kernel 38 may include drivers such as, for example, a power management driver 40, a memory management driver 42 and an input driver 44, as well as a file system 46. The illustrated OS kernel 38 also includes an external memory an initialization driver 48, where the driver 48 conducts a runtime initialization of the external system memory. Implementing the external memory initialization at runtime also enables MRC updates to be activated without repeating the boot sequence 20.

Figure 3:
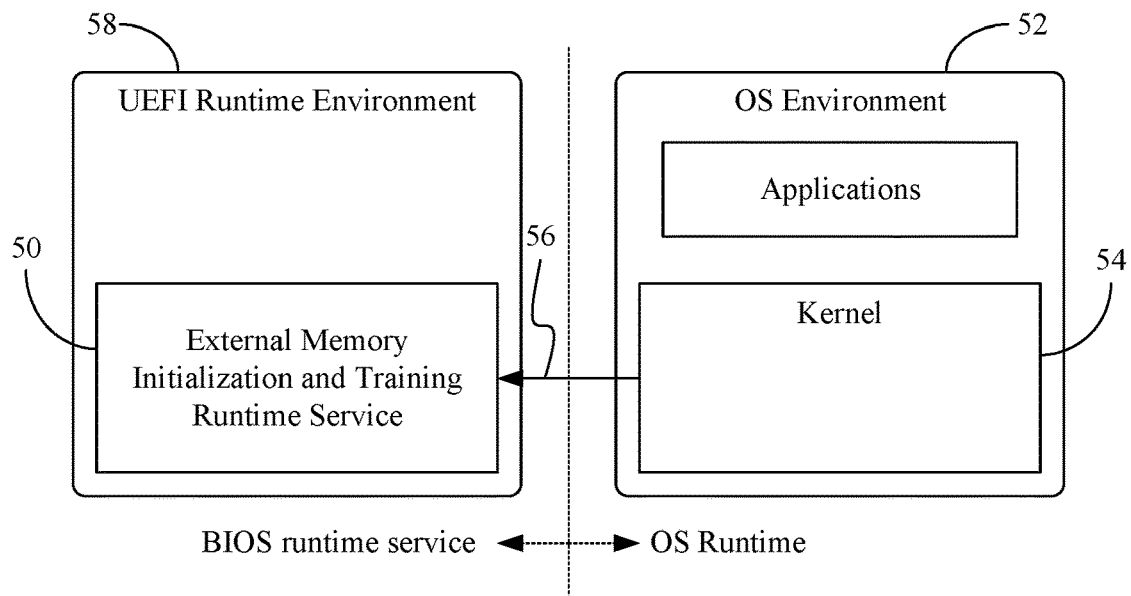
FIG. 3 is an illustration of an example of the use of a runtime service to conduct a runtime initialization according to an embodiment.

FIG. 3 demonstrates the use of a runtime service 50 instead of the driver 48 (FIG. 2) to conduct the runtime initialization of the external memory initialization. In the illustrated example, the OS environment 52 includes an OS kernel 54 that issues a call 56 from the OS runtime to a UEFI (Unified Extensible Firmware Interface) runtime environment 58 that contains the runtime service 50.

Figure 4:
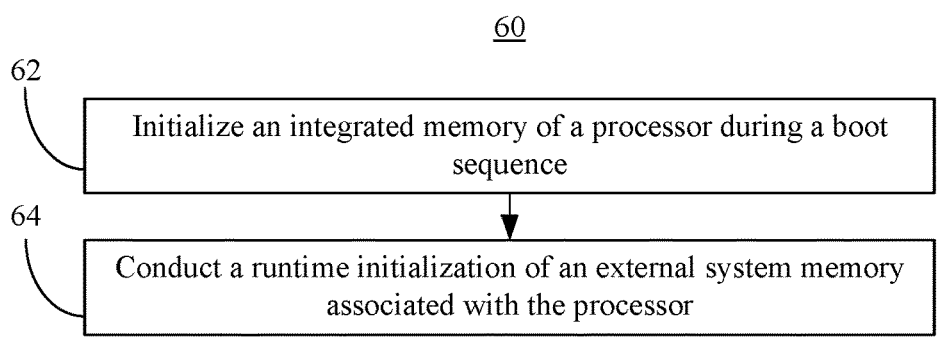
FIG. 4 is a flowchart of an example of a method of operating a performance-enhanced computing system according to an embodiment.

FIG. 4 shows a method 60 of operating a performance-enhanced computing system. The method 60 may generally be implemented in a processor such as, for example, the processor 10 (FIG. 1), already discussed. More particularly, the method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for initializing an integrated memory of a processor (e.g., memory integrated into the processor semiconductor package) during a boot sequence. In an embodiment, block 62 involves issuing one or more training commands to the integrated memory, which may include HBM. Block 64 conducts a runtime initialization of an external system memory (e.g., DDR4/DDR5 SDRAM) associated with the processor. Block 64 may include issuing one or more training commands to the external system memory after the boot sequence is complete. In one example, block 64 includes conducting the runtime initialization via an OS driver. In another example, block 64 includes issuing a call to a runtime service to trigger and/or request the runtime initialization. As already noted, block 62 may bypass the initialization of the external system memory during the boot sequence. The illustrated method 60 therefore enhances performance at least to the extent that boot times are significantly reduced.

Figure 5:
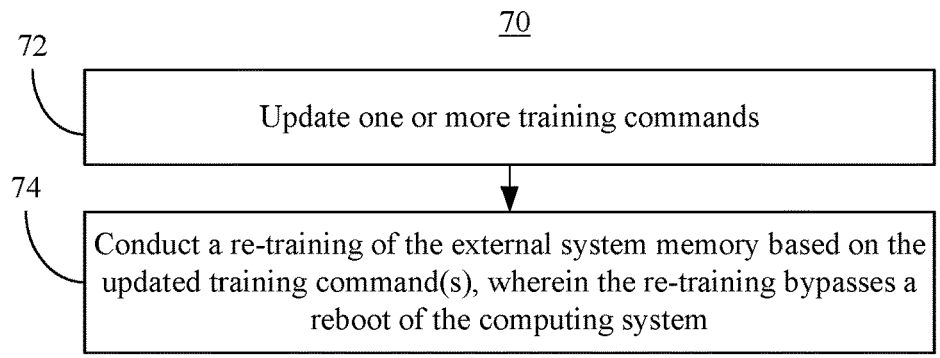
FIG. 5 is a flowchart of an example of a method of conducting a memory reference code (MRC) update according to an embodiment.

FIG. 5 shows a method 70 of conducting an MRC update. The method 70 may generally be implemented at runtime in a processor such as, for example, the processor 10 (FIG. 1), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for updating one or more training commands (e.g., mode register set/MRS, mode register write/MRW, multi-purpose command/MPC, reference voltages for command and address pins/VREFCA, etc.) in the MRC. Block 72 may also update other information in the MRC such as, for example, memory timing algorithms, margining information, and so forth. In an embodiment, the MRC update is conducted as part of a post package repair (PPR) in response to a memory error discovered via, for example, a page fault. In such a case, the PPR might involve replacing bad rows in the external system memory with redundant rows. Another example of an MRC update involves a current partial mirror memory size change. A re-training of the external system memory may be conducted at block 74 based on the updated training command(s), wherein the re-training bypasses a reboot of the computing system. The illustrated method 70 therefore further enhances performance through faster MRC updates.

Figure 6:
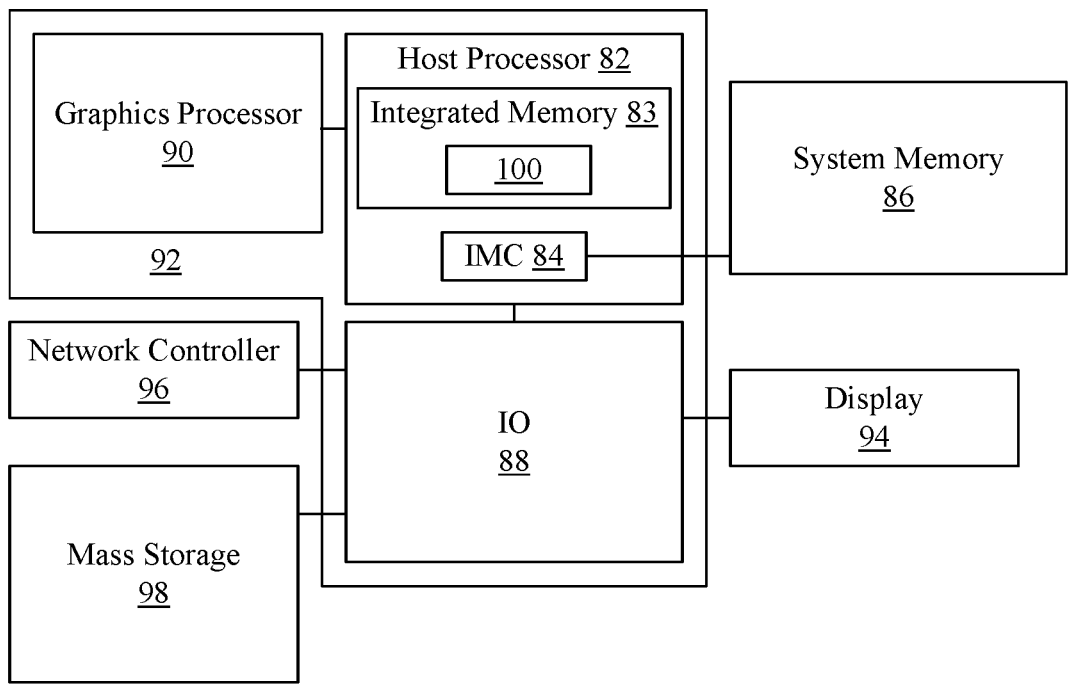
FIG. 6 is a block diagram of an example of a performance-enhanced computing system according to an embodiment.

Turning now to FIG. 6, a performance-enhanced computing system 90 is shown. The system 80 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof.

In the illustrated example, the system 80 includes a host processor 82 (e.g., central processing unit/CPU) having an integrated memory 83 (e.g., HBM) and an integrated memory controller (IMC) 84 that is coupled to a system memory 86. The illustrated system 80 also includes an input output (IO) module 88 implemented together with the host processor 82 and a graphics processor 90 on a semiconductor die 92 as a system on chip (SoC). The illustrated IO module 88 communicates with, for example, a display 94 (e.g., touch screen, liquid crystal display/LCD, light emitting diode/LED display), a network controller 96 (e.g., wired and/or wireless), and mass storage 98 (e.g., hard disk drive/HDD, optical disk, solid state drive/SSD, flash memory).

In an embodiment, the host processor 82, the graphics processor 80 and/or the IO module 88 execute program instructions 100 retrieved from the integrated memory 83 to perform one or more aspects of the method 60 (FIG. 4) and/or the method 70 (FIG. 5), already discussed. Thus, execution of the instructions 100 may cause the computing system to initialize the integrated memory 83 during a boot sequence and conduct a runtime initialization of the external system memory 86. Execution of the instructions 100 may also cause the computing system 80 to update one or more training commands and conduct a re-training of the external system memory 86 based on the updated one or more training commands. In an embodiment, the re-training bypasses a reboot of the computing system 80. The illustrated computing system 80 is therefore performance-enhanced at least to the extent that boot times are significantly reduced and MRC updates are conducted faster.

Figure 7:
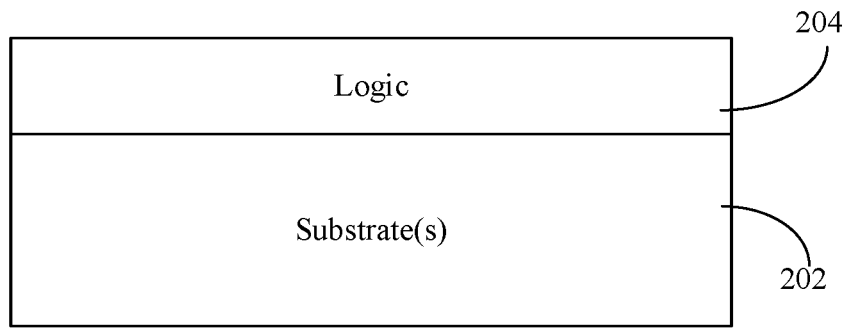
FIG. 7 is an illustration of an example of a semiconductor package apparatus according to an embodiment.

FIG. 7 shows a semiconductor apparatus 200 (e.g., chip, die, package). The illustrated apparatus 200 includes one or more substrates 202 (e.g., silicon, sapphire, gallium arsenide) and logic 204 (e.g., transistor array and other integrated circuit/IC components) coupled to the substrate(s) 202. In an embodiment, the logic 204 implements one or more aspects of the method 60 (FIG. 4) and/or the method 70 (FIG. 5), already discussed. Thus, the logic 204 may initialize an integrated memory of a processor during a boot sequence and automatically conduct a runtime initialization of the external system memory. The logic 204 may also update one or more training commands and automatically conduct a re-training of the external system memory based on the updated one or more training commands. In an embodiment, the re-training bypasses a reboot of the computing system. The illustrated apparatus 200 is therefore performance-enhanced at least to the extent that boot times are significantly reduced and MRC updates are conducted faster.

The logic 204 may be implemented at least partly in configurable logic or fixed-functionality hardware logic. In one example, the logic 204 includes transistor channel regions that are positioned (e.g., embedded) within the substrate(s) 202. Thus, the interface between the logic 204 and the substrate(s) 202 may not be an abrupt junction. The logic 204 may also be considered to include an epitaxial layer that is grown on an initial wafer of the substrate(s) 202.

Figure 8:
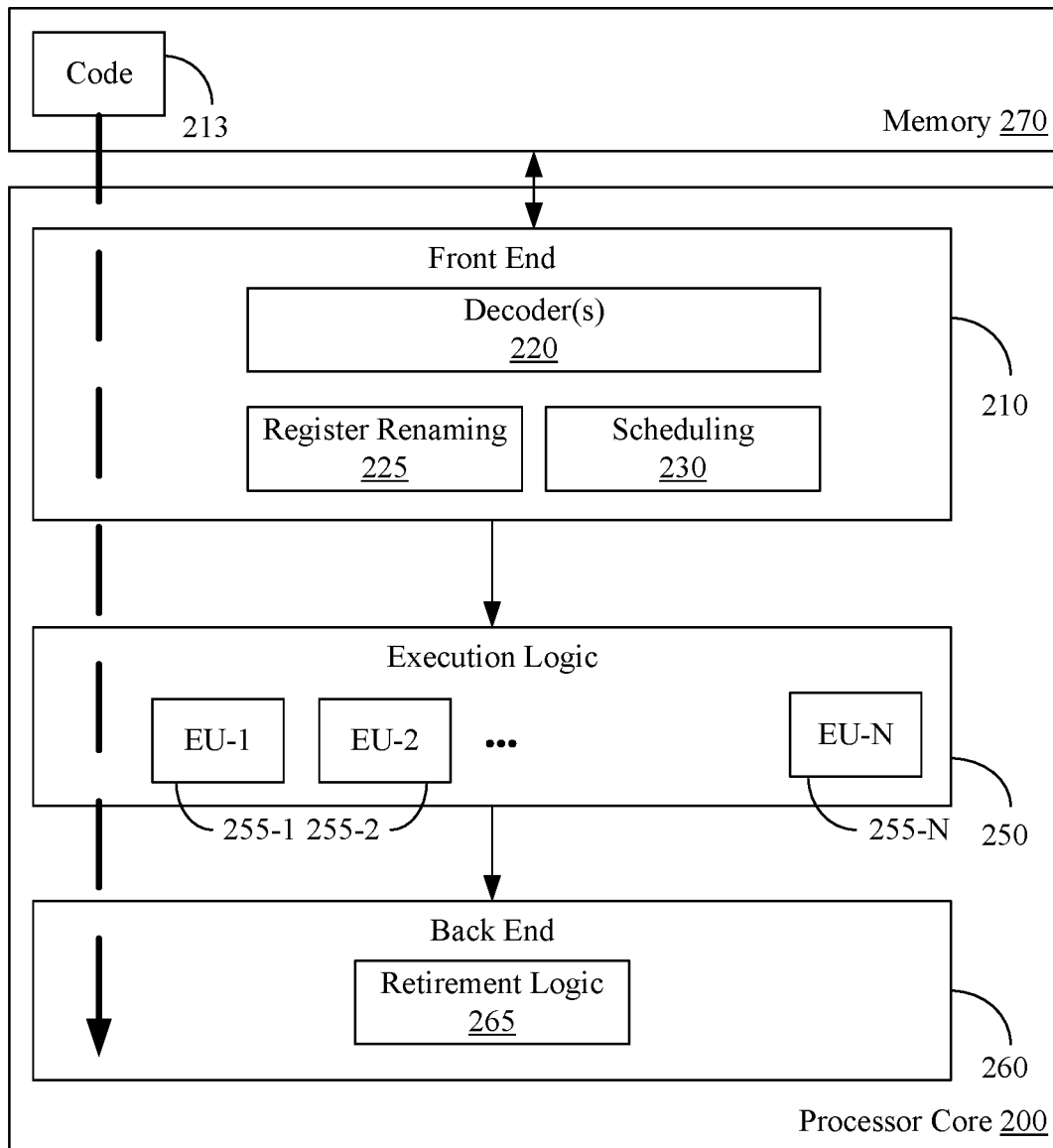
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 4) and/or the method 70 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
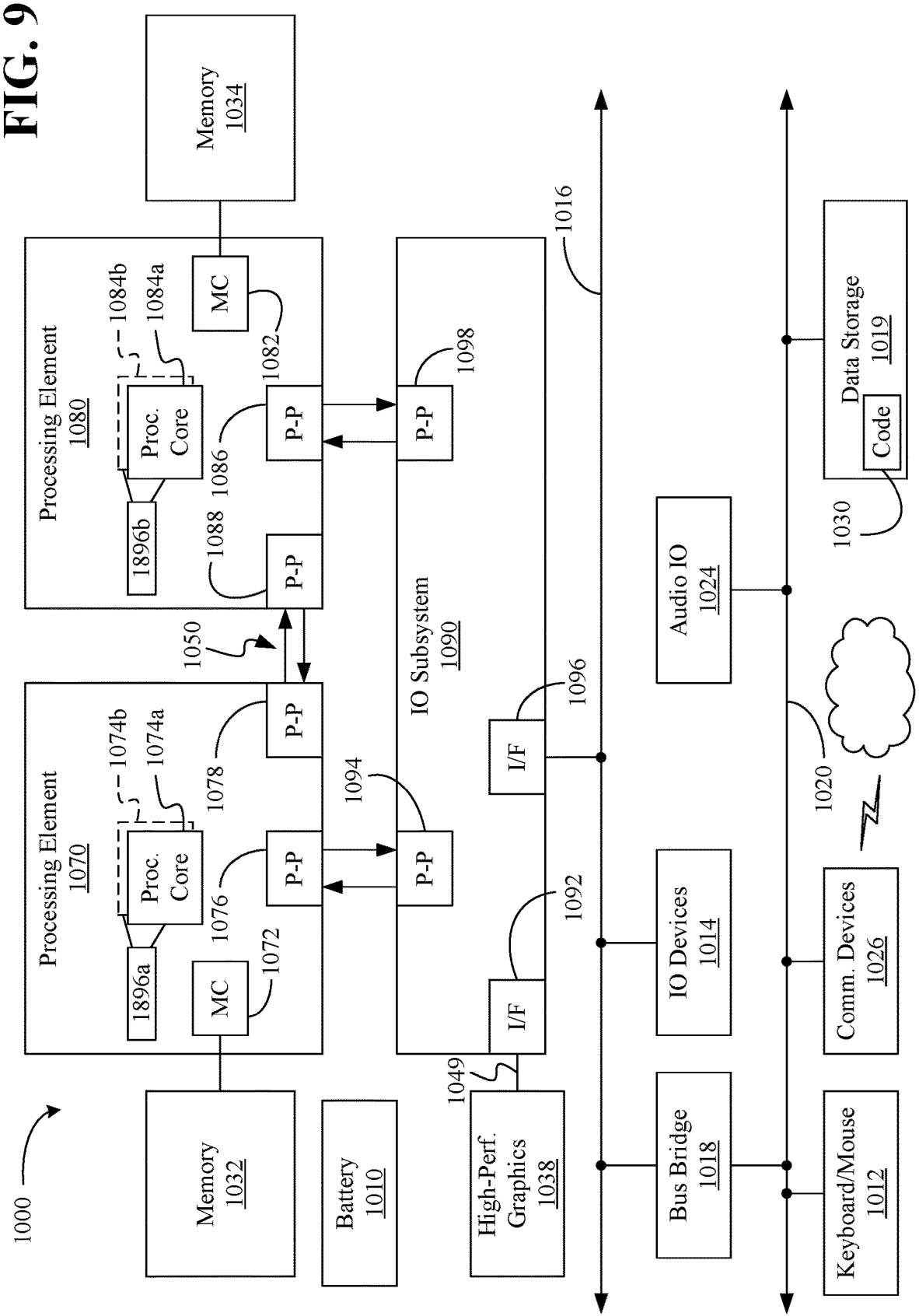
FIG. 9 is a block diagram of an example of a multi-processor based computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 4) and/or the method 70 (FIG. 5), already discussed, and may be similar to the code 213 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes a performance-enhanced computing system comprising a network controller, a processor coupled to the network controller, wherein the processor includes an integrated memory, and an external system memory coupled to the processor, wherein the integrated memory includes a set of executable program instructions, which when executed by the processor, cause the computing system to initialize the integrated memory during a boot sequence and conduct a runtime initialization of the external system memory.

Example 2 includes the computing system of Example 1, wherein to conduct the runtime initialization, the instructions, when executed, cause the computing system to issue one or more training commands to the external system memory after the boot sequence.

Example 3 includes the computing system of Example 2, wherein the instructions, when executed, further cause the computing system to update the one or more training commands, and conduct a re-training of the external system memory based on the updated one or more training commands, wherein the re-training is to bypass a reboot of the computing system.

Example 4 includes the computing system of Example 1, wherein the runtime initialization is to be conducted via an operating system driver.

Example 5 includes the computing system of Example 1, wherein the instructions, when executed, further cause the computing system to issue a call to a runtime service to trigger the runtime initialization.

Example 6 includes the computing system of any one of Examples 1 to 5, wherein the instructions, when executed, further cause the computing system to bypass the runtime initialization during the boot sequence.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to initialize an integrated memory of a processor during a boot sequence, and conduct a runtime initialization of an external system memory associated with the processor.

Example 8 includes the apparatus of Example 7, wherein to conduct the runtime initialization, the logic coupled to the one or more substrates is to issue one or more training commands to the external system memory after the boot sequence, update the one or more training commands, and conduct a re-training of the external system memory based on the updated one or more training commands, wherein the re-training is to bypass a reboot.

Example 9 includes the apparatus of Example 7, wherein the runtime initialization is to be conducted via an operating system driver.

Example 10 includes the apparatus of Example 7, wherein the logic coupled to the one or more substrates is to issue a call to a runtime service to trigger the runtime initialization.

Example 11 includes the apparatus of any one of Examples 7 to 10, wherein the logic coupled to the one or more substrates is to bypass the runtime initialization during the boot sequence.

Example 12 includes the apparatus of any one of Examples 7 to 10, wherein the logic coupled to the one or more substrates includes transistor channel regions that are positioned within the one or more substrates.

Example 13 includes at least one computer readable storage medium comprising a set of executable program instructions, which when executed by a computing system, cause the computing system to initialize an integrated memory of a processor during a boot sequence, and conduct a runtime initialization of an external system memory associated with the processor.

Example 14 includes the at least one computer readable storage medium of Example 13, wherein to conduct the runtime initialization, the instructions, when executed, cause the computing system to issue one or more training commands to the external system memory after the boot sequence.

Example 15 includes the at least one computer readable storage medium of Example 14, wherein the instructions, when executed, further cause the computing system to update the one or more training commands, and conduct a re-training of the external system memory based on the updated one or more training commands, wherein the retraining is to bypass a reboot of the computing system.

Example 16 includes the at least one computer readable storage medium of Example 13, wherein the runtime initialization is to be conducted via an operating system driver.

Example 17 includes the at least one computer readable storage medium of Example 13, wherein the instructions, when executed, further cause the computing system to issue a call to a runtime service to trigger the runtime initialization. Example 18 includes the at least one computer readable storage medium of any one of Examples 13 to 17, wherein the instructions, when executed, further cause the computing system to bypass the runtime initialization during the boot sequence.

Example 19 includes a method of operating a performance-enhanced computing system, the method comprising initializing an integrated memory of a processor during a boot sequence, and conducting a runtime initialization of an external system memory associated with the processor.

Example 20 includes the method of Example 19, wherein conducting the runtime initialization includes issuing one or more training commands to the external system memory after the boot sequence.

Example 21 includes the method of Example 20, further including updating the one or more training commands, and conducting a re-training of the external system memory based on the updated one or more training commands, wherein the re-training bypasses a reboot of the computing system.

Example 22 includes the method of Example 19, wherein the runtime initialization is conducted via an operating system driver.

Example 23 includes the method of Example 19, further including issuing a call to a runtime service to trigger the runtime initialization.

Example 24 includes the method of any one of Examples 19 to 23, further including bypassing the runtime initialization during the boot sequence.

Example 25 includes an apparatus comprising means for performing the method of any one of Examples 19 to 24.

Thus, technology described herein may leverage the modular design of many server systems to boot to the OS without DIMM population (e.g., supporting memory hot plugging in the OS, with separate host processors and DIMMs in the server system). As DIMM capacities increase exponentially generation from generation, especially in server platforms, the technology prevents boot times from also increasing.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A performance-enhanced computing system comprising:
   a network controller;
   a processor coupled to the network controller, wherein the processor includes an integrated memory; and
   an external system memory coupled to the processor, wherein the integrated memory includes a set of executable program instructions, which when executed by the processor, cause the computing system to:
   initialize the integrated memory during a boot sequence, and
   conduct a runtime initialization of the external system memory after the boot sequence is complete, wherein one or more training commands are issued to the external system memory after the boot sequence to conduct the runtime initialization.

2. The computing system of claim 1, wherein the instructions, when executed, further cause the computing system to:
   update the one or more training commands; and conduct a re-training of the external system memory based on the updated one or more training commands, wherein the re-training is to bypass a reboot of the computing system.

3. The computing system of claim 1, wherein the runtime initialization is to be conducted via an operating system driver.

4. The computing system of claim 1, wherein the instructions, when executed, further cause the computing system to issue a call to a runtime service to trigger the runtime initialization.

5. The computing system of claim 1, wherein the instructions, when executed, further cause the computing system to bypass the runtime initialization during the boot sequence.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
initialize an integrated memory of a processor during a boot sequence; and
conduct a runtime initialization of an external system memory associated with the processor after the boot sequence is complete, wherein one or more training commands are issued to the external system memory after the boot sequence to conduct the runtime initialization.

7. The apparatus of claim 6, wherein to conduct the runtime initialization, the logic coupled to the one or more substrates is to:
update the one or more training commands; and
conduct a re-training of the external system memory based on the updated one or more training commands, wherein the re-training is to bypass a reboot.

8. The apparatus of claim 6, wherein the runtime initialization is to be conducted via an operating system driver.

9. The apparatus of claim 6, wherein the logic coupled to the one or more substrates is to issue a call to a runtime service to trigger the runtime initialization.

10. The apparatus of claim 6, wherein the logic coupled to the one or more substrates is to bypass the runtime initialization during the boot sequence.

11. The apparatus of claim 6, wherein the logic coupled to the one or more substrates includes transistor channel regions that are positioned within the one or more substrates.

12. At least one computer readable storage medium comprising a set of executable program instructions, which when executed by a computing system, cause the computing system to:
initialize an integrated memory of a processor during a boot sequence; and
conduct a runtime initialization of an external system memory associated with the processor after the boot sequence is complete, wherein one or more training commands are issued to the external system memory after the boot sequence to conduct the runtime initialization.

13. The at least one computer readable storage medium of claim 12, wherein the instructions, when executed, further cause the computing system to:
update the one or more training commands; and
conduct a re-training of the external system memory based on the updated one or more training commands, wherein the re-training is to bypass a reboot of the computing system.

14. The at least one computer readable storage medium of claim 12, wherein the runtime initialization is to be conducted via an operating system driver.

15. The at least one computer readable storage medium of claim 12, wherein the instructions, when executed, further cause the computing system to issue a call to a runtime service to trigger the runtime initialization.

16. The at least one computer readable storage medium of claim 12, wherein the instructions, when executed, further cause the computing system to bypass the runtime initialization during the boot sequence.

17. A method of operating a performance-enhanced computing system, the method comprising:
initializing an integrated memory of a processor during a boot sequence; and
conducting a runtime initialization of an external system memory associated with the processor after the boot sequence is complete, wherein one or more training commands are issued to the external system memory after the boot sequence to conduct the runtime initialization.

18. The method of claim 17, further including:
updating the one or more training commands; and
conducting a re-training of the external system memory based on the updated one or more training commands, wherein the re-training bypasses a reboot of the computing system.

19. The method of claim 17, wherein the runtime initialization is conducted via an operating system driver.

20. The method of claim 17, further including issuing a call to a runtime service to trigger the runtime initialization.

21. The method of claim 17, further including bypassing the runtime initialization during the boot sequence.

22. An apparatus comprising means for performing the method of claim 17.

* * * * *